July 15, 1924.
R. E. WOODSON
NUT CRACKING MACHINE
Original Filed Dec. 22, 1922
1,501,259
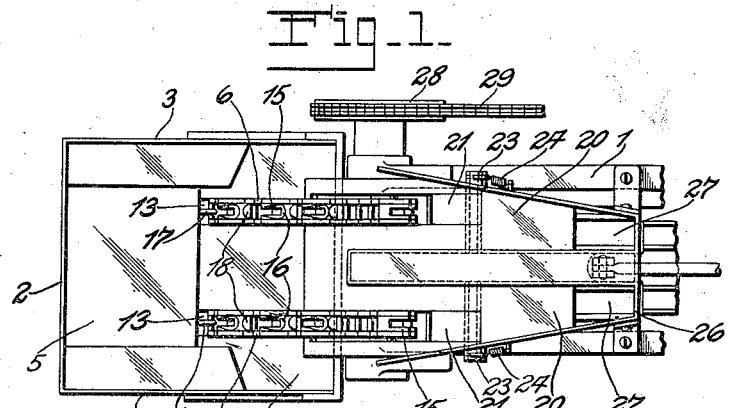
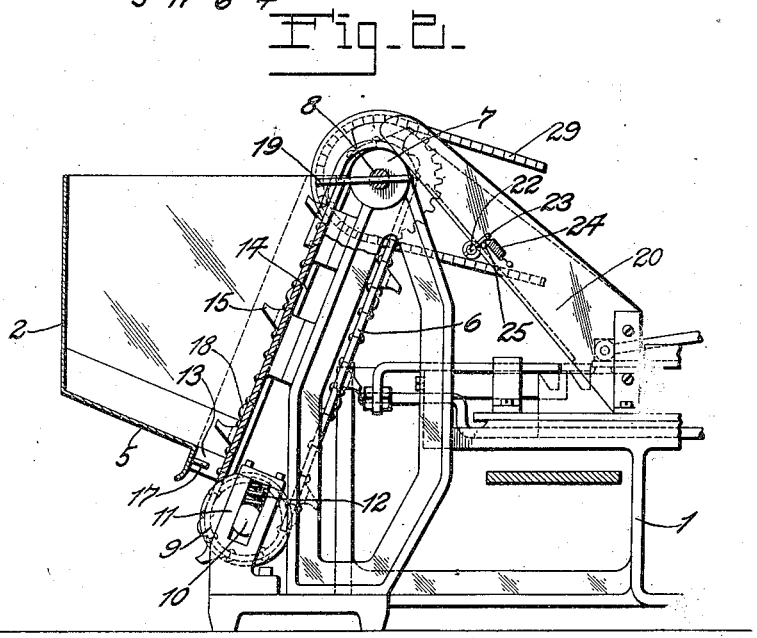
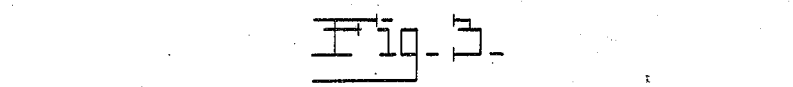
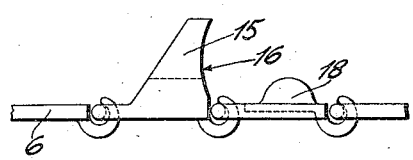
Inventor.
Robert E. Woodson,
by Rippey & Kingsland,
His Attorneys.

Patented July 15, 1924.

1,501,259

UNITED STATES PATENT OFFICE.

ROBERT E. WOODSON, OF WEBSTER GROVES, MISSOURI.

NUT-CRACKING MACHINE.

Original application filed December 22, 1922, Serial No. 608,408. Divided and this application filed August 3, 1923. Serial No. 655,415.

*To all whom it may concern:*

Be it known that I, ROBERT E. WOODSON, a citizen of the United States, residing at Webster Groves, St. Louis County, Missouri, have invented a new and useful Nut-Cracking Machine, of which the following is a specification.

This invention relates to nut cracking machines, and has special reference to the devices for conveying the nuts from a hopper to the nut cracking mechanism. This case is a division of my prior application Serial No. 608,408, filed December 22, 1922.

An object of the invention is to improve generally the conveyor and other devices for conveying nuts from the hopper to the nut cracking mechanism, and to provide means to prevent the conveyor from discharging toward the nut cracking mechanism more than one nut at a time.

Other objects will appear from the following description, reference being made to the drawings in which—

Fig. 1 is a plan view of the present invention.

Fig. 2 is a side elevation of the same with the hopper in section.

Fig. 3 is an enlarged view showing a portion of the conveyor and the construction thereof which prevents the discharge of more than one nut at a time toward the nut cracking mechanism.

The machine in which the present embodiment of the invention is shown comprises a pair of side frames 1 having at one end a hopper for containing the nuts to be cracked. The hopper includes a rear wall 2, side walls 3, a forwardly inclined inner wall 4 and a downwardly and forwardly inclined bottom wall 5.

The machine in which the invention is shown is a duplex or two unit machine having a capacity for cracking two nuts at each operation of the cracking devices, but it is clear that the machine may be constructed with any desired capacity. As shown, there is a conveyor for each cracking device and the two conveyors shown operate to convey the nuts from the same hopper.

As shown each conveyor comprises a chain 6 engaging and being operated by sprocket wheels 7 attached to a shaft 8 rotatively supported near the upper edge of the inclined inner wall 4 of the hopper. The chains also pass around rollers 8 below the hopper. The rollers 9 are on a horizontal shaft 10 having its ends mounted in guides 11 in which the shaft is capable of movement toward and away from the shaft 8. The shaft 10 is pressed downwardly by springs 12 which hold the conveyor chains 6 under proper tension. The conveyor chains 6 pass through openings 13 in the bottom wall 5 of the hopper adjacent to the inclined inner wall 4 and operate in channels or guides 14 in the inner wall 4 of the hopper.

The nut holders on the conveyor chains comprise bifurcated arms 15, each having a recess 16 for the reception of a nut. Pins 17 project into the openings 13 to prevent the nuts from dropping through and to permit the nut holders 15 to pass. The conveyor chains 6 have ejectors in the form of nuts 18 thereon adjacent to the nut holders 15 to prevent lodgment of more than one nut on each nut holder. Each nut holder forms a complete link in the chain and the ejector 18 is on the link that is pivotally connected with the nut holder link. The shaft 8 supports a radial pin 19 at the side of each conveyor chain which cooperate with the ejectors 18 to prevent lodgment of more than one nut on the nut holders and to cause proper discharge of the nuts from the conveyors. Thus the nuts are discharged one at a time by each conveyor as the nut holders 15 pass over the sprocket wheels 7. The nuts are discharged into inclined chutes 20 having hinged plates 21 onto which the nuts drop from the nut holders and which are engaged by the nut holders successively and actuated downwardly until the nut holders pass.

The plates 21 are attached to a rockable rod 22 having pins 23 in its ends to which springs 24 are connected for closing the plates 21. The pins 23 engage stops 25 to hold the plates 21 in proper position.

The chutes 20 incline downwardly and forwardly tapering somewhat toward their lower ends. The side walls of the chutes extend downwardly beyond the bottom walls and are connected by a front wall 26. From the lower ends of the bottom walls of the chutes the nuts drop to shuttle devices 27 and thence are delivered to the nut cracking devices.

A sprocket wheel 28 is rigid with one end of the shaft 8 and is engaged by a power driven chain 29 whereby the conveyor devices are operated.

From the foregoing it will be seen that my invention accomplishes all of its intended objects and purposes very efficiently and satisfactorily. The specific construction and formation of the parts may be varied without departure from the nature and principle of the invention.

I do not restrict myself unessentially, but what I claim and desire to secure by Letters Patent is:—

1. In a nut cracking mechanism, an inclined wall for supporting the nuts as the nuts move toward the nut cracking mechanism and having an opening at its upper end, a conveyor for conveying nuts for delivery to said wall, an inclined plate having its lower end near the lower end of said opening and its upper end near said conveyor for receiving nuts delivered thereto from the conveyor and arranged to yield to permit the conveyor to pass, a support on which the lower end of said plate is pivoted near the lower end of said opening, a spring yieldingly supporting said plate in position to receive nuts delivered thereto from the conveyor and permitting said plate to turn on said support, and elements preventing movement of said plate upwardly beyond proper position.

2. In a nut cracking machine, nut cracking mechanism, a hopper for the nuts to be cracked having an opening through the bottom thereof, a conveyor passing through said opening and through said hopper for conveying the nuts from the hopper for delivery to the nut cracking mechanism, an inclined guide in which the conveyor operates, bifurcated nut holders on the conveyor for conducting the nuts one by one from the hopper, a projection supported by the hopper and extending into said opening and permitting the arms of the bifurcated nut holders to pass at the side thereof and prevent the nuts from dropping through said opening, and an ejector knob on said conveyor adjacent to each nut holder preventing lodgment of more than one nut on a holder.

3. In a nut cracking machine, a conveyor chain for conveying nuts to be cracked, holders on the chain for supporting the nuts, and a rounded projection rigid with a link of the chain adjacent to each holder permitting lodgment of a single nut on the adjacent holder and preventing lodgment of one nut upon another.

4. In a nut cracking machine, a downwardly inclined chute for conducting nuts toward the nut cracking mechanism, a hopper for containing the nuts, a conveyor composed of a series of pivotally united links, projecting nut holders on a number of said links, and a projection rigid with one of the links connected to each link supporting a nut holder preventing lodgment of one nut upon another.

5. In a nut cracking machine, a conveyor chain for conveying nuts to be cracked, bifurcated recessed holders on the chain for supporting the nuts, and a rounded projection rigid with a link of the chain adjacent to each holder preventing lodgment of one nut upon another.

ROBERT E. WOODSON.